(12) United States Patent
Xu

(10) Patent No.: US 6,758,489 B2
(45) Date of Patent: Jul. 6, 2004

(54) INFLATOR USED AS DAMPER FOR STEERING WHEEL

(75) Inventor: Xiaoping Xu, Rochester Hills, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 62 days.

(21) Appl. No.: 10/268,695

(22) Filed: Oct. 11, 2002

(65) Prior Publication Data

US 2004/0070185 A1 Apr. 15, 2004

(51) Int. Cl.[7] .............................................. B60R 21/16
(52) U.S. Cl. ............................... 280/728.1; 280/728.2; 280/731
(58) Field of Search .......................... 280/728.1, 728.2, 280/731

(56) References Cited

U.S. PATENT DOCUMENTS

| 5,186,490 | A | * | 2/1993 | Adams et al. | ............... 280/731 |
|---|---|---|---|---|---|
| 6,176,516 | B1 | * | 1/2001 | Bobler et al. | ............... 280/731 |
| 6,325,411 | B1 | * | 12/2001 | Rigner et al. | ............... 280/731 |
| 6,361,065 | B1 | * | 3/2002 | Frisch | ..................... 280/728.2 |
| 6,435,540 | B1 | * | 8/2002 | Durre | ..................... 280/728.2 |
| 6,439,599 | B1 | * | 8/2002 | Laue et al. | ................. 280/731 |
| 6,517,105 | B1 | * | 2/2003 | Ford | .......................... 280/731 |
| 6,592,141 | B1 | * | 7/2003 | Dancasius et al. | ....... 280/728.2 |

FOREIGN PATENT DOCUMENTS

| EP | 1026050 A2 | * | 2/2000 |
|---|---|---|---|
| EP | 1065110 A1 | * | 6/2000 |

* cited by examiner

Primary Examiner—Paul N. Dickson
Assistant Examiner—Toan C To
(74) Attorney, Agent, or Firm—Lonnie Drayer

(57) ABSTRACT

A steering wheel assembly has a steering wheel and an airbag disposed about the steering wheel. The airbag is contained within an airbag housing spaced from an airbag inflator to form a gap between the airbag inflator and the airbag housing. A shield selectively bridges the gap between the airbag inflator and the airbag housing.

17 Claims, 7 Drawing Sheets

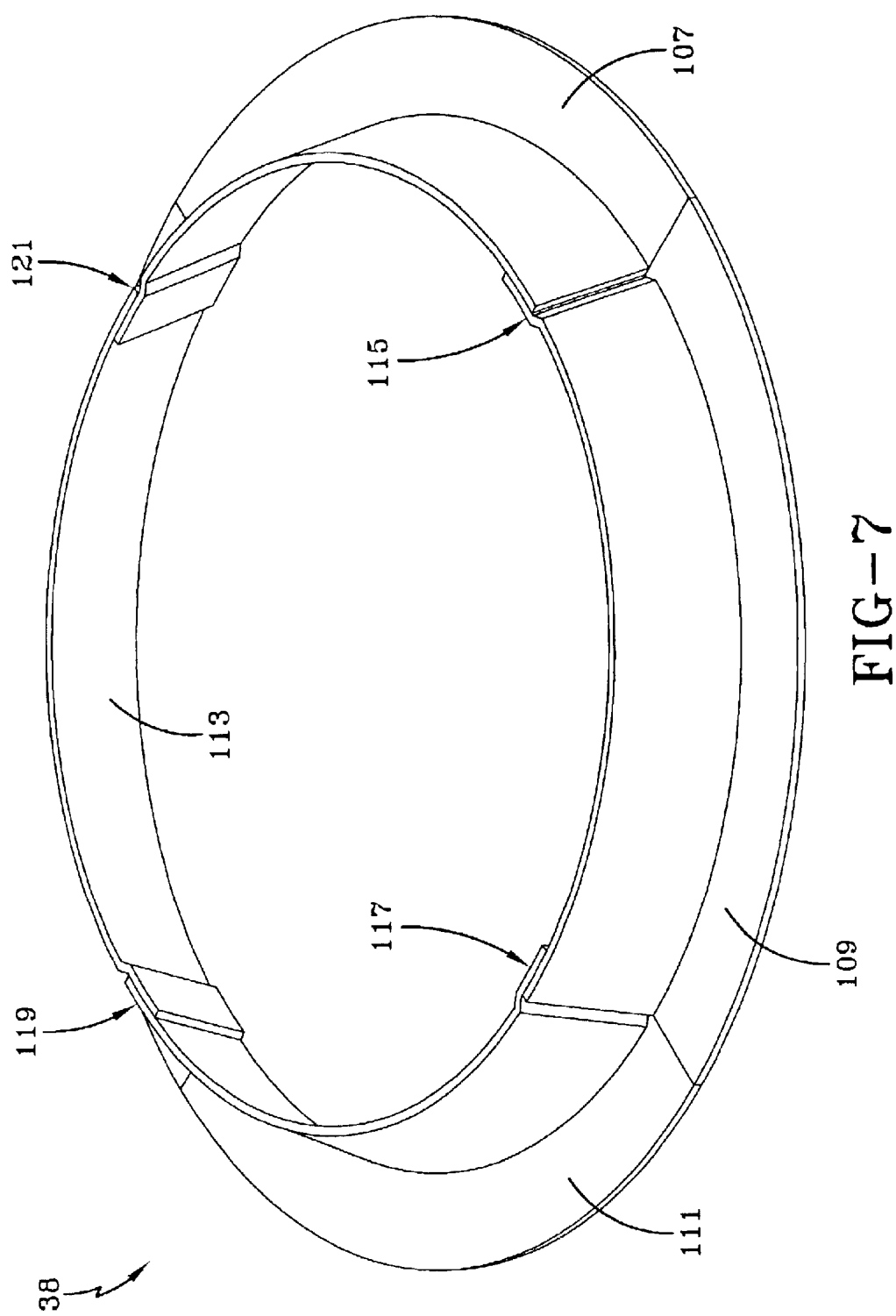

INFLATOR USED AS DAMPER FOR STEERING WHEEL

FIELD OF THE INVENTION

The present invention relates to a damper for a steering wheel assembly.

BACKGROUND OF THE INVENTION

Most steering wheels require a mass damper to dampen the vibration of a steering wheel, which may vibrate as a consequence of road conditions. The mass damper serves to reduce or eliminate vibration of the steering wheel for an anticipated range of frequencies. A mass damper, however, is expensive and requires space inside the limited room offered by a steering wheel assembly. Moreover, the mass damper increases the total mass of the steering wheel.

Driver side airbag modules are located in the limited space offered by the steering wheel assembly. The airbag module may comprise an airbag, airbag housing, and airbag inflator as a single unit installed within the steering wheel assembly. It has been suggested to use the airbag inflator as the mass damper for the steering wheel. However, the use of the airbag inflator as a damper presents challenges. One such challenge is preventing the leakage of gas from the inflator into the passenger compartment during deployment of the airbag. This gas is typically hot, and it would be undesirable to release the gas into this compartment.

There is therefore a need to use the airbag inflator as a mass damper while still preventing the leakage of gas from the airbag housing into the passenger compartment.

SUMMARY OF THE INVENTION

The present invention comprises a steering wheel assembly that uses an airbag inflator as a mass damper. An airbag is stored in an airbag housing. The housing is spaced from the airbag inflator to permit the free movement of the inflator relative to the steering wheel, thereby permitting the inflator to act as a mass damper. As a consequence of this spacing, a gap between the airbag inflator and the airbag housing exists. Upon activating of the airbag inflator, a shield bridges the gap between the airbag inflator and the airbag housing, directing the gas from the inflator to the airbag and preventing the gas' escape into the passenger compartment.

The shield may deform from the pressure of the escaping gas from the airbag inflator and, by deforming, bridge the gap between the airbag inflator and the airbag housing. The shield may comprise a ring having overlapping segments to promote deformation. In addition, the shield may comprise two layers with one layer folded over a portion of the other layer to provide additional protection against the escape of gas.

In this way, the shield may serve to seal a gap between the airbag housing and the airbag inflator. Thus, during normal operation of the vehicle, the shield is drawn away from the gap to permit the free movement of the airbag inflator. Upon activation of the airbag inflator, the shield closes the gap. Accordingly, the airbag inflator may be supported to move freely relative to the steering wheel and thus damp its vibration by a resilient connection to the steering wheel. The airbag inflator may be tuned to damp a range of vibration frequencies of the steering wheel so as to limit steering wheel vibration.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

FIG. 7 illustrates a segmented ring shield.

DETAILED DESCRIPTION OF THE INVENTION

Figure 1:
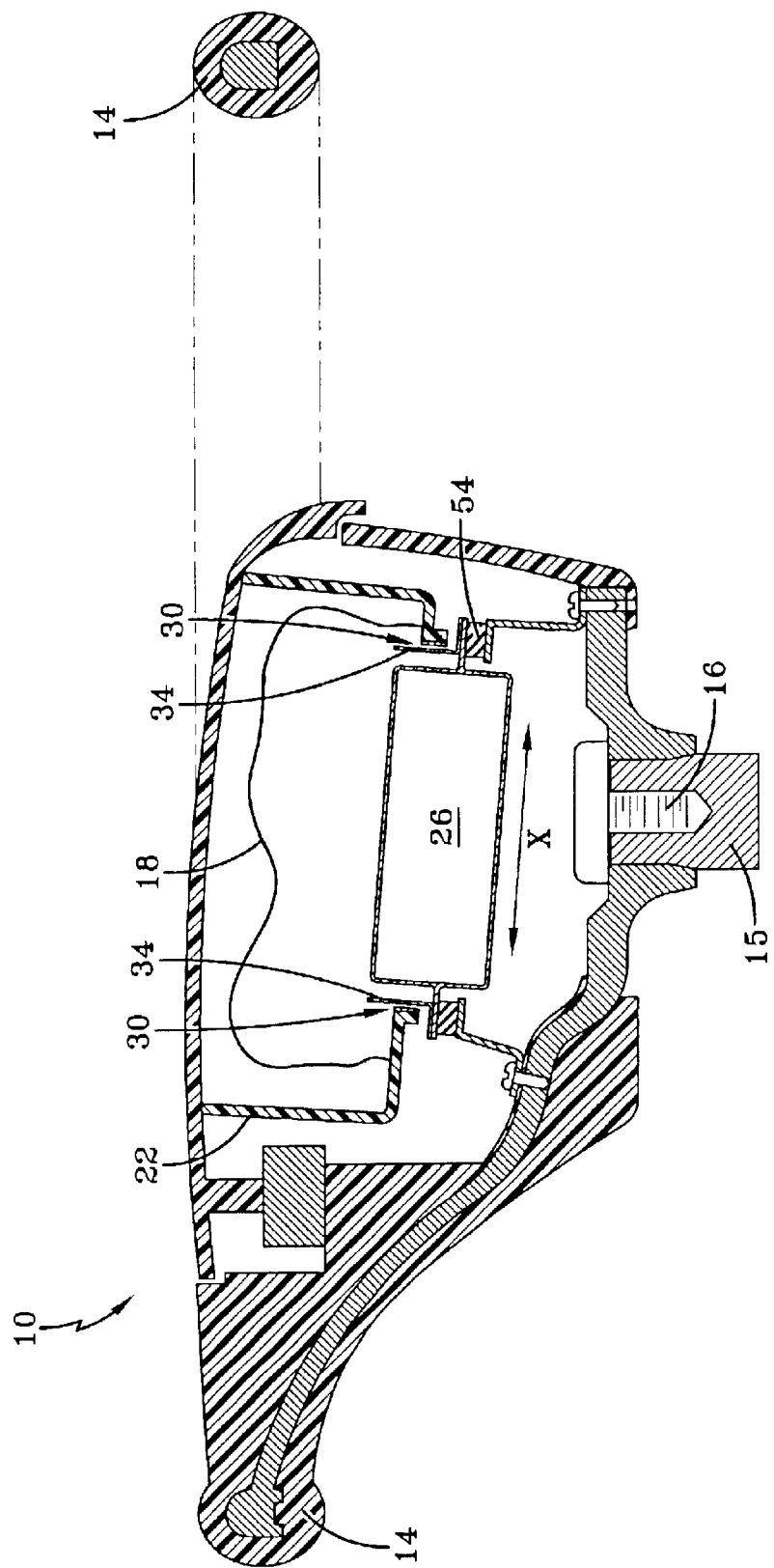
FIG. 1 illustrates the inventive steering wheel assembly, including airbag inflator, airbag housing, and shield.

FIG. 1 illustrates the inventive steering wheel assembly 10. The steering wheel assembly 10 comprises a steering wheel 14, shown in cross-section, in which is disposed an airbag 18, an airbag housing 22 and an airbag inflator 26. The steering wheel 14 is connected to the steering column 15 through a bolt 16. In prior airbag designs the airbag, airbag housing, and airbag inflator form a single unit.

To permit the use of an airbag inflator 26 as a vibration damper, the airbag inflator 26 is separated from an airbag housing 22 thereby creating a gap 30 between the airbag inflator 26 and the airbag housing 22. In this way, the airbag inflator 26 is free to move along an axis X and an axis Y. The X axis is as shown while the Y axis is orthogonal to the X axis and into the page of FIGS. 1 and 2.

Figure 3:
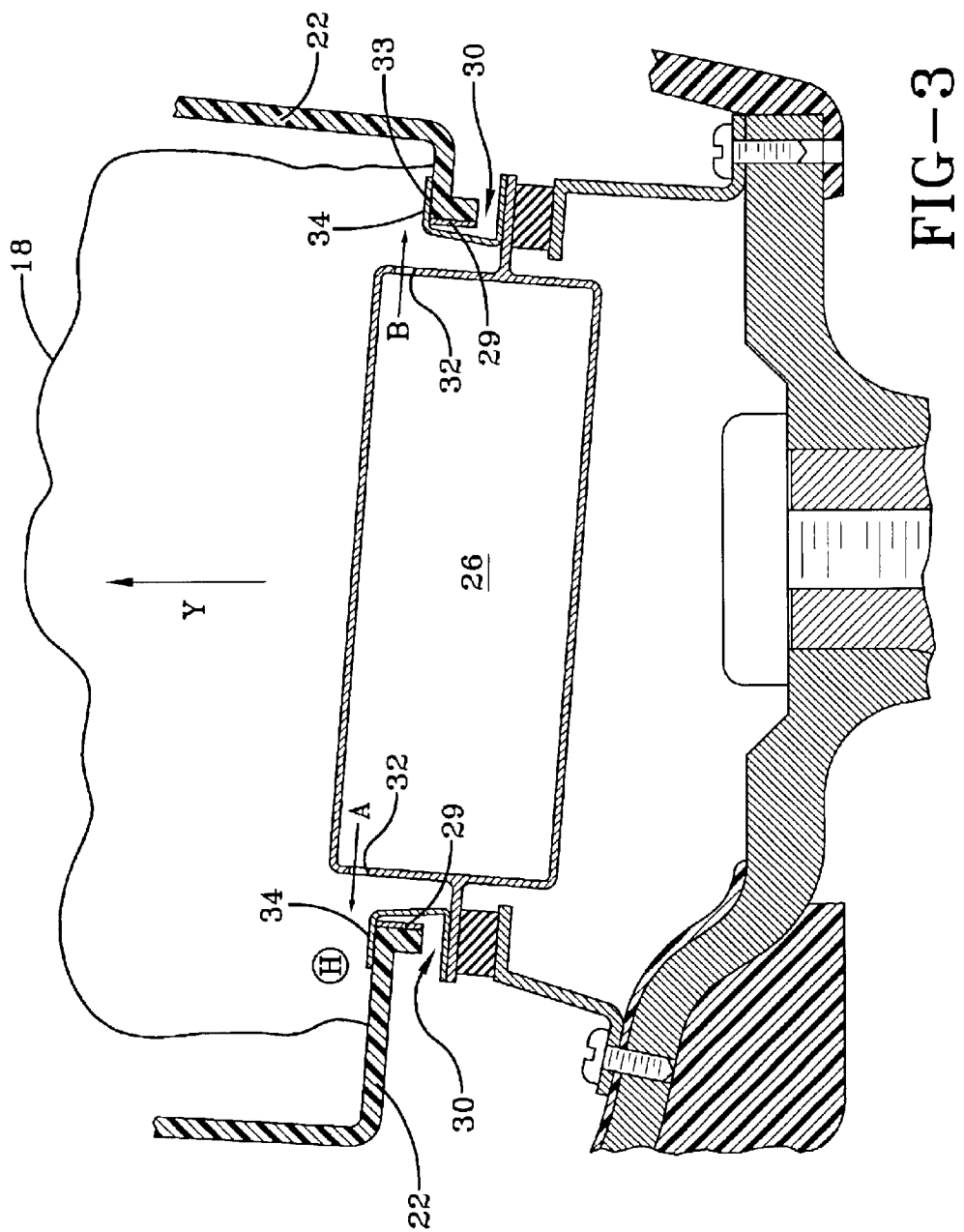
FIG. 3 illustrates a bridging of the gap of FIG. 2 during deployment of an airbag.

As shown in FIG. 3, the airbag inflator 26 is connected to a steering wheel 14 through a flange 39, which is mounted to a support 54, a resilient knob such as a piece of rubber, attached to a leg 56. The leg 56 attaches to s steering wheel armature 57 of the steering wheel 14 as shown. A support 54, which may comprise a rubber mount for an airbag inflator 26, permits an airbag inflator 26 to damp vibration of the steering wheel 14 over a wide range of frequencies. The airbag inflator 26 may have a predetermined mass that is related to the particular range of vibration frequencies to be damped. This mass may be determined by known techniques. To achieve this mass, mass in addition to that needed by the inflator may be added.

While a gap 30 permits movement of the airbag inflator 26 along axis X to act as a vibration damper at inflation, it also permits the escape of gas from the airbag inflator into a passenger compartment of a vehicle. This gas tends to be extremely hot. Given the proximity of the driver to the steering wheel 14, it is undesirable to allow this hot gas to escape.

Figure 2:
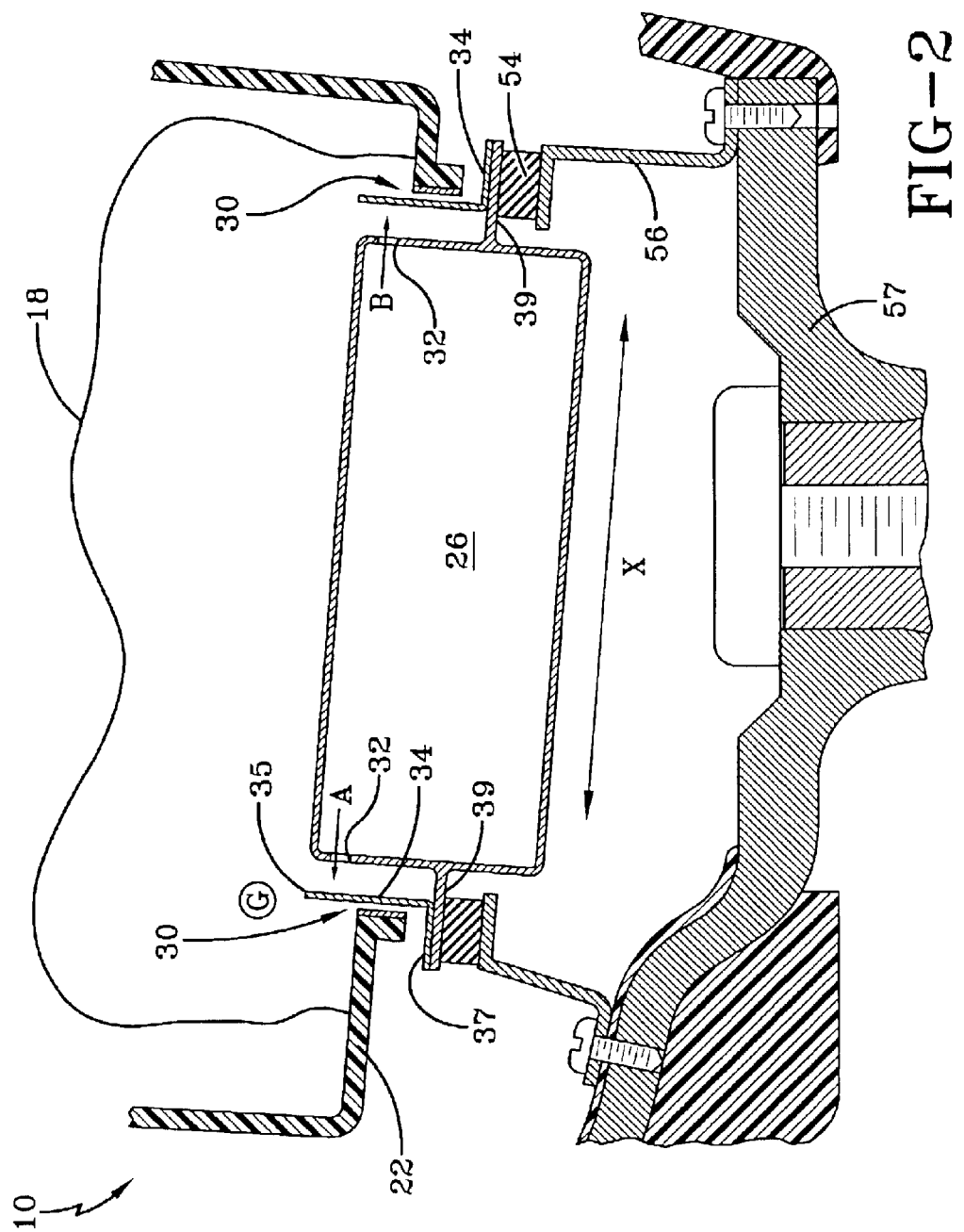
FIG. 2 illustrates a close up view of the invention of FIG. 1 highlighting a gap between airbag housing and airbag inflator.

This problem is solved by the shield 34, which surrounds the airbag inflator 26 as shown in FIG. 2. The shield 34 may be disposed between the airbag housing 22 and the airbag inflator 26 so as to be in the direct path of the gas escaping from the airbag inflator 26 along arrows A and B through the nozzles 32 of the airbag inflator 26. The shield 34 may be made of metal, such as steel, having a thickness between 0.5 mm to 1 mm. The metal may be capable of deforming at pressures between 1,500 to 2,000 PSI, the pressure of gas released from nozzles 32. The pressure increase may be from 0 PSI to 2,000 PSI in less than 5 milliseconds upon activation of the airbag. The exact thickness of the shield 34 will vary with the metal selected and the pressure of gas released from the inflator but may be determined using known techniques. Moreover, the metal should be capable of withstanding the high temperature of the escaping gas from a airbag inflator 26.

FIG. 3 illustrates how the shield 34 the bridges gap 30 between the airbag inflator 26 and the airbag housing 22. During activation of the airbag inflator 26, hot gas escapes from the nozzles 32 along such directions as indicated by arrow A and arrow B. As shown, the shield 34 is in the path of the gases, and the gases are directed at the shield. Because the shield 34 is thin, hot gas from nozzles 32 will deform the shield 34 to cover the gap 30 providing a seal 33 between the airbag housing 22 and the airbag inflator 26. Due to the positioning, this deformation occurs almost immediately when gas flow begins. In this way, hot gas is prevented from escaping into a passenger compartment through the gap 30 and instead deploys the airbag 18 along the arrow Y.

As shown in FIG. 2, the shield 34 may comprise a first portion 37 attached to a flange 39 of the airbag inflator and second portion 35, which is free to move and orthogonal to first portion 37. Generally then, the shield 34 comprises an L shaped circular lip extending around the periphery of the airbag inflator 26.

As shown in FIG. 3, the airbag housing 22 is provided with stops 29 to provide a flat surface around which the shield 34 may deform. The stops 29 may comprise a soft thin material, such as tape, that reduces the noise between the airbag housing 22 and the metal shield 34 resulting from the inflation of the airbag 18. In this way, the shield 34 acts like a door having a first position G and a second position H. The shield 34 would leave a gap open at position G and close the gap at position H.

Figure 4:
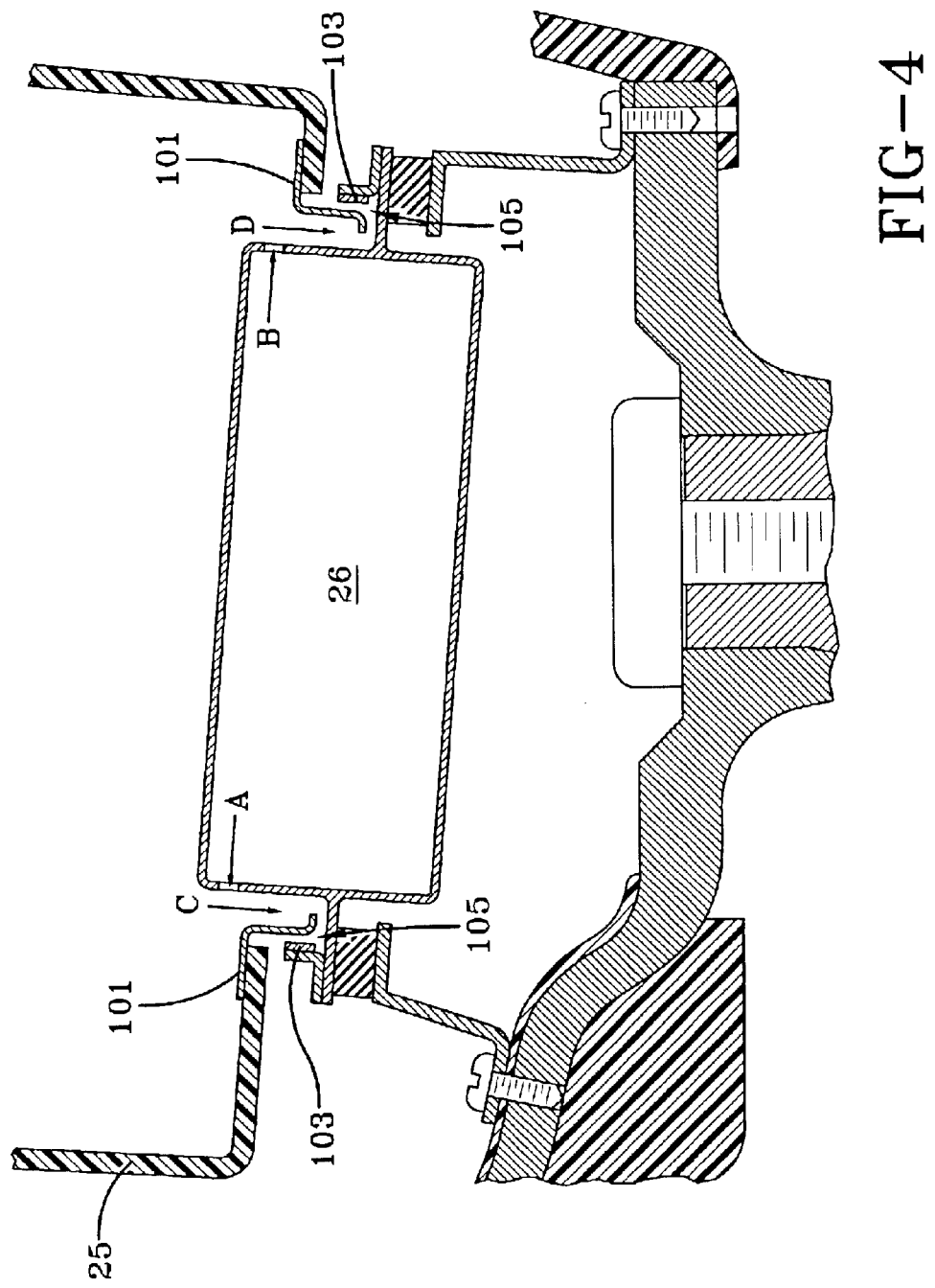
FIG. 4 illustrates an alternative placement of a shield.

FIG. 4 illustrates an alternative mounting of the shield. As shown, the shield 101 may be mounted to the airbag housing 25 rather than to the airbag inflator 26. Gas from the airbag inflator 26 would still escape along the directions of arrows A and B but would be permitted to also escape along arrows C and D to cause the shield 101 to deform and contact the stop 103, thereby closing the gap 105.

Figure 5:
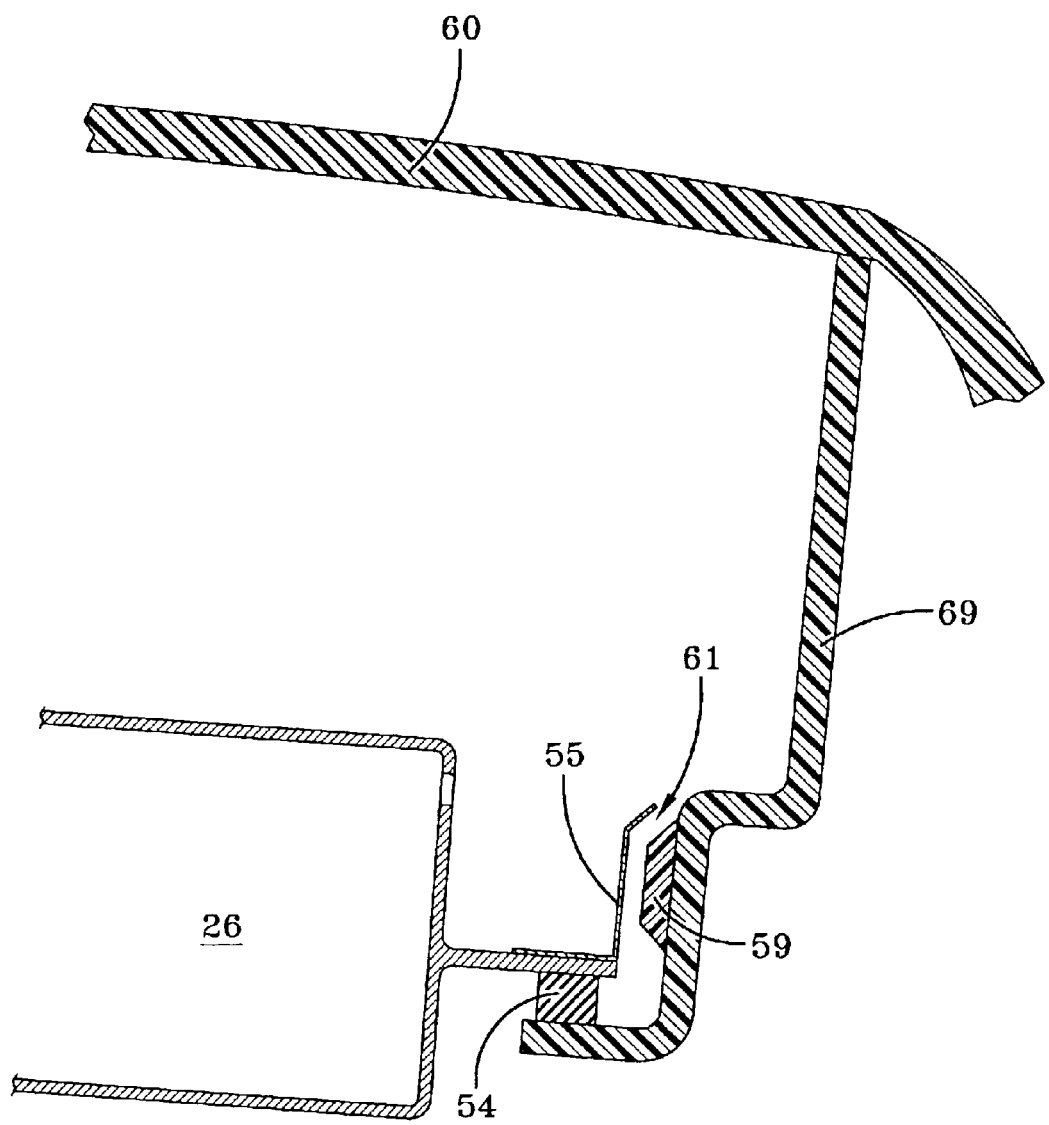
FIG. 5 illustrates an alternative mounting feature of the invention.

FIG. 5 illustrates another way to mount an airbag inflator 26 to act as a damper for a steering wheel 14. As shown, the airbag inflator 26 is mounted to a support 54, a resilient rubber mount, which itself is mounted to an airbag housing 69 instead of to an independent leg as shown in FIGS. 1–3. A gap 61 exists between the airbag inflator 26 and the airbag housing 69, requiring a shield 55, which selectively bridges a gap 61 upon actuation of the airbag inflator 26. The shield 55 will contact the stop 59. The airbag inflator 26 is operatively in contact and in vibration communication with a steering wheel 14 through the airbag housing 69 and the steering wheel cover 60, permitting the damping of the steering wheel by the airbag inflator 26.

Figure 6:
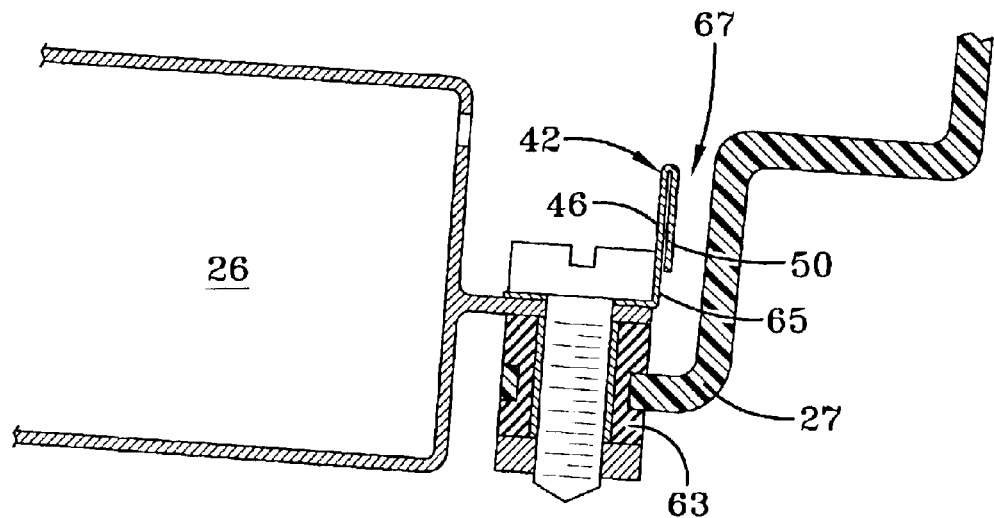
FIG. 6 illustrates a double folded shield.
Figure 6A:
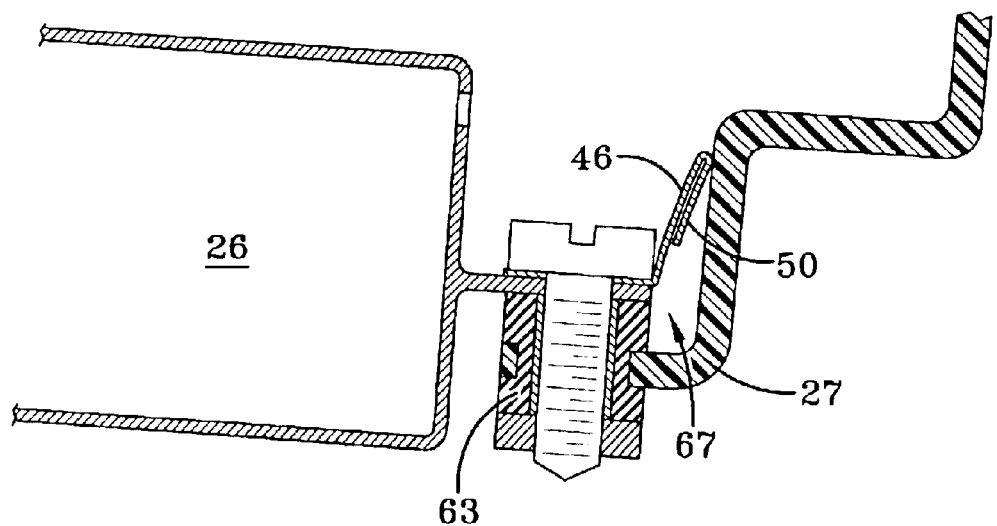
FIG. 6A illustrates a double folded shield in its actuated position.

FIG. 6 illustrates an inflator 26 resiliently mounted to the airbag housing 27 through support 63. In addition, the shield 42 is shown as a dual layer shield comprising a first layer 46 and a second layer 50 with the second layer 50 folded over the first layer 46 while still leaving a portion 65 of the first layer 46, not overlapped. The dual layer protection provides additional sealing protection across the gap 67 following deformation or bending of the shield 46. Having a portion 65 of the shield 46 not overlapped by the second layer 50 permits the shield 46 to bend and deform more easily. FIG. 6A shows the shield 42 deformed with the second layer 50 sealing against the airbag housing 27.

FIG. 7 illustrates another shield design comprising a ring 38 having four segments 107, 109, 111 and 113. Each segment overlaps the other at overlap portions 115, 117, 119 and 121. The segments 107, 109, 111 and 113 are not adhered to each other but merely overlap at overlap portions 115, 117, 119 and 121. In this way, the ring 38 may easily deform segment by segment without the rigidity or resistance to deformation encountered by a non-segmented ring.

The aforementioned description is exemplary rather that limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

What is claimed is:

1. A steering wheel assembly, comprising:
   a steering wheel;
   an airbag assembled with said steering wheel;
   an airbag housing storing said airbag;
   an airbag inflator spaced from said airbag housing to form a gap between said airbag inflator and said airbag housing; and
   a shield selectively bridging said gap between said airbag inflator and said airbag housing, and said air bag inflator discharges a gas for inflating said airbag that causes said shield to bridge said gap during activation of said airbag inflator.

2. The steering wheel assembly of claim 1 wherein said shield deforms to bridge said gap.

3. The steering wheel assembly of claim 2 wherein said shield comprises a ring having overlapping segments.

4. The steering wheel assembly of claim 1 wherein said shield comprises a first layer and a second layer folded over at least a portion of said first layer.

5. The steering wheel assembly of claim 1 wherein said shield seals said gap.

6. The steering wheel assembly of claim 1 wherein said shield has first position and a second position, said first position leaving said gap open and said second position closing said gap.

7. The steering wheel assembly of claim 1 wherein said airbag inflator is supported to move relative to said steering wheel to damp vibration of said steering wheel.

8. The steering wheel assembly of claim 7 wherein said airbag Inflator is resiliently connected to said steering wheel.

9. A steering wheel assembly, comprising:
   a steering wheel;
   an airbag assembled with said steering wheel;
   an airbag housing storing said airbag;
   an airbag inflator spaced from said airbag housing to form a gap between said airbag inflator and said airbag housing; and
   a shield selectively bridging said gap between said airbag inflator and said airbag housing wherein said shield bridges said gap during activation of said airbag inflator, said airbag inflator discharging a gas for inflating said airbag that also causes said shield to bridge said gap.

10. The steering wheel assembly of claim 9 wherein said shield deforms to bridge said gap.

11. The steering wheel assembly of claim 10 wherein said shield comprises a ring having overlapping segments.

12. A The steering wheel assembly of claim 9 wherein said shield comprises a first layer and a second layer folded over at least a portion of said first layer.

13. The steering wheel assembly of claim 9 wherein said shield seals said gap.

14. The steering wheel assembly of claim 9 wherein said shield has a first position and a second position, said first position leaving said gap open and said second position closing said gap.

15. The steering wheel assembly of claim 9 wherein said airbag inflator is supported to move relative to said steering wheel to damp vibration of said steering wheel.

16. The steering wheel assembly of claim 15 wherein said airbag inflator is resiliently connected to said steering wheel.

17. The steering wheel assembly of claim 15 wherein said airbag inflator comprises a predetermined mass based upon an anticipated vibration frequency of said steering wheel.

* * * * *